United States Patent
Ashner et al.

(10) Patent No.: US 10,455,008 B2
(45) Date of Patent: *Oct. 22, 2019

(54) INDIVIDUALIZED CONNECTIVITY BASED REQUEST HANDLING

(71) Applicant: Engine Media, LLC, Princeton, NJ (US)

(72) Inventors: Louis Clayton Ashner, New York, NY (US); Michael Zacharski, Pawling, NY (US); Michael Adam Grosinger, New York, NY (US); Mickey Alexander Schwab, Chicago, IL (US); John Patrick Roach, New York, NY (US)

(73) Assignee: ENGINE MEDIA, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,188

(22) Filed: Aug. 13, 2018

(65) Prior Publication Data
US 2019/0141117 A1    May 9, 2019

Related U.S. Application Data

(63) Continuation of application No. 15/807,309, filed on Nov. 8, 2017, now Pat. No. 10,051,046.

(51) Int. Cl.
| | |
|---|---|
| *H04L 29/08* | (2006.01) |
| *H04L 12/26* | (2006.01) |
| *H04L 12/24* | (2006.01) |

(52) U.S. Cl.
CPC ........ *H04L 67/101* (2013.01); *H04L 43/0852* (2013.01); *H04L 67/14* (2013.01);
(Continued)

(58) Field of Classification Search
CPC .... G06Q 30/08; G06Q 40/04; G06Q 30/0275; G06Q 30/0601; G06Q 30/0277;
(Continued)

(56) References Cited

U.S. PATENT DOCUMENTS

| | | |
|---|---|---|
| 7,477,623 B2 | 1/2009 | Chang |
| 7,904,347 B2 | 3/2011 | Hasseler |

(Continued)

OTHER PUBLICATIONS

PCT Search Report and Written Opinion dated Oct. 26, 2018 issued for International PCT Application No. PCT/US18/46455 filed on Aug. 13, 2018.
(Continued)

*Primary Examiner* — Ninos Donabed
(74) *Attorney, Agent, or Firm* — K&L Gates LLP

(57) ABSTRACT

Individualized connectivity based request handling is disclosed. For example, a content source is accessed by a client device and a load balancer executes on a processor to receive a first request based on the client device accessing the content source. A first session variable is set to a first value in a first session and a first latency to the client device is measured. A first plurality of target nodes is selected based on the first session variable. A first plurality of messages is sent to the first plurality of target nodes. A second request is received from the client device after the first session expires, starting a second session. The first session variable is set to a different second value in the second session. A second plurality of messages is sent to a second plurality of target nodes different from the first plurality of target nodes.

26 Claims, 6 Drawing Sheets

(52) U.S. Cl.
CPC .......... *H04L 41/50* (2013.01); *H04L 43/0882* (2013.01); *H04L 67/2814* (2013.01); *H04L 67/32* (2013.01)

(58) Field of Classification Search
CPC ............... G06Q 10/02; G06Q 30/0641; G06Q 30/0643; H04W 16/14; H04W 72/0453; H04L 5/0058; H04L 5/14
See application file for complete search history.

(56) References Cited

U.S. PATENT DOCUMENTS

| | | | |
|---|---|---|---|
| 8,831,987 | B2 | 9/2014 | Knapp et al. |
| 8,983,859 | B2 | 3/2015 | Nice et al. |
| 9,077,617 | B1 | 7/2015 | Seth et al. |
| 2005/0144068 | A1 | 6/2005 | Calabria et al. |
| 2008/0015973 | A1 | 1/2008 | Erisman |
| 2008/0065479 | A1 | 3/2008 | Tomlin et al. |
| 2008/0228564 | A1 | 9/2008 | de Heer et al. |
| 2009/0048966 | A1 | 2/2009 | Bishop et al. |
| 2009/0070310 | A1 | 3/2009 | Srivastava et al. |
| 2009/0099910 | A1 | 4/2009 | Merkin et al. |
| 2009/0327032 | A1 | 12/2009 | Gunawardana et al. |
| 2010/0036954 | A1* | 2/2010 | Sakata ................ H04L 12/6418 709/226 |
| 2010/0070373 | A1 | 3/2010 | Zoeter |
| 2010/0082472 | A1 | 4/2010 | Cheung |
| 2010/0145809 | A1 | 6/2010 | Knapp et al. |
| 2010/0235241 | A1 | 9/2010 | Wang et al. |
| 2010/0235243 | A1 | 9/2010 | Hecht |
| 2010/0241486 | A1 | 9/2010 | Garg et al. |
| 2010/0250357 | A1 | 9/2010 | Kim |
| 2011/0040635 | A1 | 2/2011 | Simmons et al. |
| 2011/0060646 | A1 | 3/2011 | Park |
| 2012/0030034 | A1* | 2/2012 | Knapp ................ G06Q 30/02 705/14.71 |
| 2013/0066705 | A1 | 3/2013 | Umeda |
| 2013/0311317 | A1 | 11/2013 | Dorr |
| 2014/0058849 | A1 | 2/2014 | Saifee et al. |
| 2014/0229313 | A1 | 8/2014 | Shimizu |
| 2015/0019347 | A1 | 1/2015 | Naghdy et al. |
| 2015/0051986 | A1 | 2/2015 | Saifee et al. |
| 2015/0112811 | A1 | 4/2015 | Connors et al. |
| 2015/0120468 | A1 | 4/2015 | Knapp et al. |
| 2015/0154650 | A1 | 6/2015 | Umeda |
| 2015/0310500 | A1 | 10/2015 | Nolet et al. |
| 2015/0317678 | A1 | 11/2015 | Huang et al. |
| 2017/0103429 | A1 | 4/2017 | Sura et al. |
| 2017/0134424 | A1* | 5/2017 | Egorov ................ H04L 67/146 |

OTHER PUBLICATIONS

B. Levine, Ad Exchange bRealTime Launches Biddr+ for Header Bidding, Jan. 19, 2017.
Amazon Web Services, Advertising Serving, May 2012.
Amazon Web Services, Building a Real-Time Bidding Platform on AWS, Feb. 2016, https://d0.awsstatic.com/whitepapers/Building_a_Real_Time_Bidding_Platform_on_AWS_v1_Final.pdf.
Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.

* cited by examiner

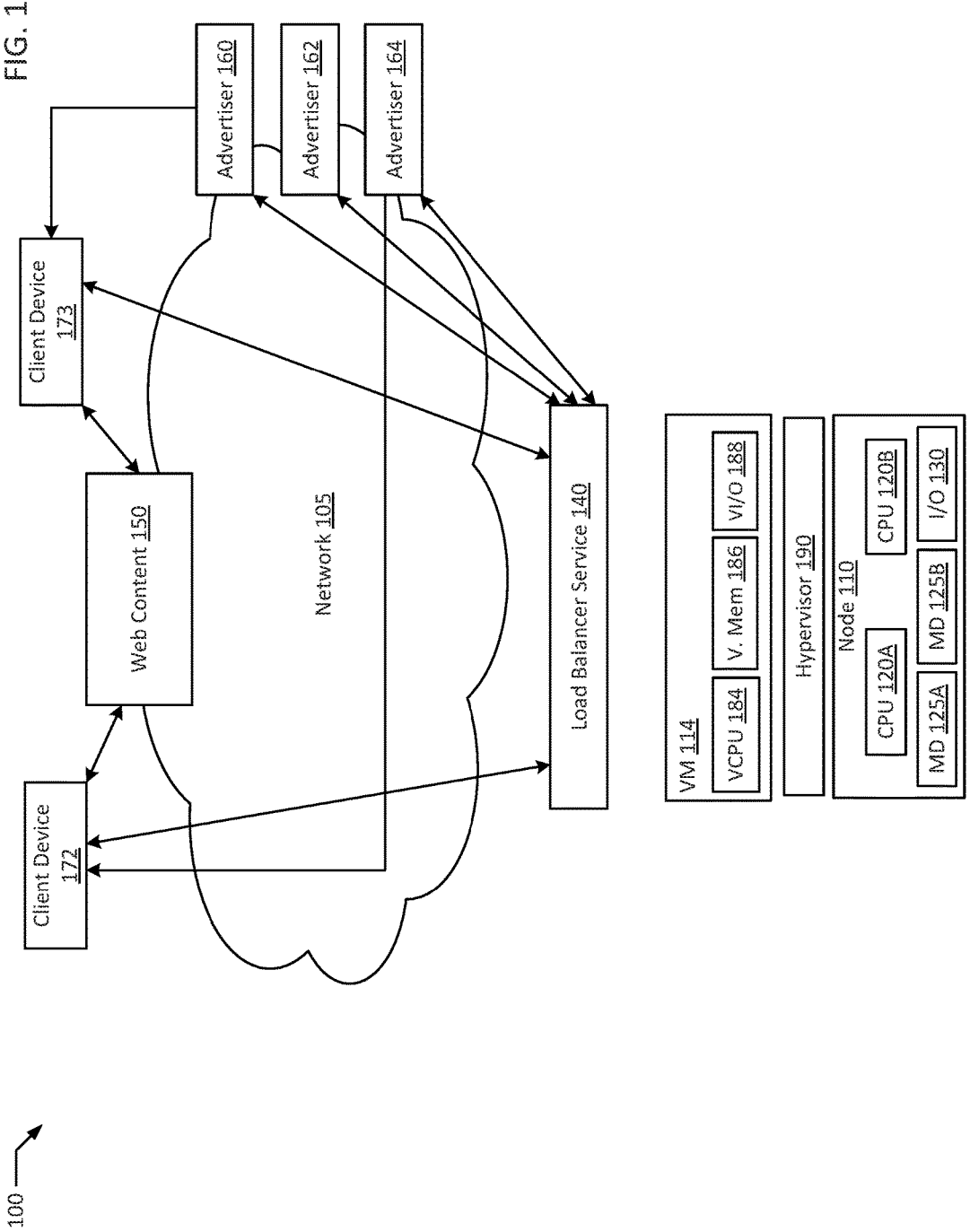

INDIVIDUALIZED CONNECTIVITY BASED REQUEST HANDLING

CROSS-REFERENCE TO RELATED APPLICATIONS

This application is a continuation of U.S. patent application Ser. No. 15/807,309, filed on Nov. 8, 2017, the entire contents of which are incorporated by reference herein for all purposes.

BACKGROUND

The present disclosure generally relates to content delivery to network accessible devices such as the delivery of advertisements. As microprocessors have become more efficient, and network connectivity more prevalent, an ever increasing amount of devices now have internet or intranet enabled capabilities and features. With the network capabilities of network accessible devices, come opportunities for users to consume content, and therefore opportunities for publishers of content to advertise to these users. Advertisers are presented with ever increasing opportunities to reach their increasingly accessible consumers through a myriad of network accessible devices used by these consumers on a daily basis. To maximize the value of each advertisement opportunity, it is typically advantageous for publishers of content to offer an advertisement opportunity to as many potential advertisers as feasible. Improving the speed and reliability of content delivery across a network, including the delivery of advertisements, is important for providing consumers using network accessible devices with a satisfactory user experience.

SUMMARY

The present disclosure provides a new and innovative system, methods and apparatus for individualized connectivity based request handling. In an example, a system of individualized connectivity based request handling comprises a content source, where a client device accesses the content source, and a load balancer executing on one or more processors to receive a first request based on the client device accessing the content source. A first session variable is set to a first value in a first session. A first latency to the client device is measured based on the first request. A first plurality of target nodes is selected based on the first session variable. A first plurality of messages is sent to the first plurality of target nodes. A second request is received from the client device after the first session expires, where the second request starts a second session. The first session variable is set to a different second value in the second session. A second plurality of messages is sent to a second plurality of target nodes different from the first plurality of target nodes.

Additional features and advantages of the disclosed method and apparatus are described in, and will be apparent from, the following Detailed Description and the Figures.

BRIEF DESCRIPTION OF THE FIGURES

FIG. 1 is a block diagram of a system performing individualized connectivity based request handling according to an example of the present disclosure.

DETAILED DESCRIPTION OF EXAMPLE EMBODIMENTS

Figure 2A:
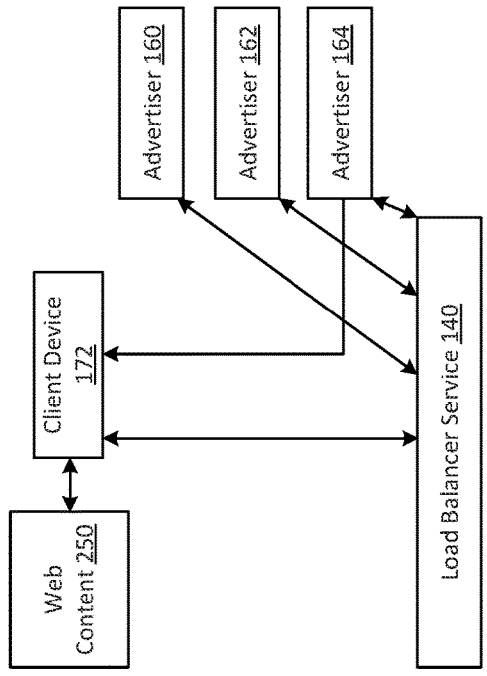
FIGS. 2A and B are block diagrams of an advertisement bidding system enhanced by individualized connectivity based request handling according to an example of the present disclosure.

As network accessible devices increasingly gain popularity, content consumption on such devices increases, resulting in people using network accessible devices becoming more informed than ever. These network accessible devices also offer a platform for alerting and informing a large audience about events, from world news and natural disasters, to local show times, concert tickets going on sale, viral videos, social media alerts, securities prices, etc. Such network retrieved content may typically be monetized through advertising. With the vast variety of devices capable of presenting audio and visual advertisements ("ads"), comes numerous opportunities to display ads, and also competition for the advertising opportunities or ad impressions. Typically, a publisher serving content may coordinate with advertisers using a bidding process to display ads in content served to consumers of the publisher's content. A page of content, such as a web page on a web site, may include multiple ad slots where ads may be displayed. In an example, each ad slot, when loaded to a client device and viewed by a user of the client device may result in an ad impression. An ad impression may be an opportunity for an advertiser to reach a given user at a given time, and therefore each time a user loads a given page of content, and/or each time a different user loads the page of content, each ad slot on the page may become a new ad impression. In an example, a publisher may therefore request for advertisers to bid on each ad impression to maximize the value of each respective ad impression. For advertisers, ad agencies, and/or ad exchanges, response time to requests for bids may therefore be critical for maximizing both the likelihood of securing an ad impression as well as the effectiveness of a given ad impression. As users typically expect perceivably immediate responses when accessing content online, the entire process for negotiating, selecting, and displaying an ad may typically be completed in under one second. In a typical day, billions of ads may be served to consumers on network accessible devices. Publishers may be incentivized to maximize the advertisers bidding on each of their ad impressions to generate maximum value from each impression.

In a typical advertising exchange implementation, a user on a network accessible client device may access content supplied by a publisher. The publisher may incorporate ad slots in the content, and then seek prospective buyers (e.g., advertisers) for the ad impressions in the content in real-time while the content is loading, for example, by broadcasting an ad request for each ad slot loaded to the client device as an ad impression. An ad agency may, upon receipt of a request to bid on a given ad slot, seek advertisers either directly or through an advertising exchange to purchase the ad slot. For example, header bidding may be a typical implementation by which publishers and ad agencies request bids for and subsequently serve advertisements. A typical header bidding implementation may be based on the open source project Prebid.js where a typical request for bids on an ad slot may be in the form of a hypertext transfer protocol ("HTTP") GET request with query string parameters related to the particular ad slot, such as a tag id, a referrer, and a size of the ad impression. For example, a header bidding request may be in the form of a Uniform Resource Locator ("URL") without an additional message payload such as, http://www.example.com/getBid?tagid=55&referrer=mysite.com&width=300&height=250. In an example, an HTTP header associated with a request may include additional information pertinent to the request, such as User Agent, Content Type, Content Length, etc. In an example, requests for bids on an ad slot may also be in the form of an HTTP POST request. For example, in implementations based on the open source project OpenRTB, a bid may be in the form of an HTTP POST request with a JavaScript Object Notation ("JSON") payload. A typical JSON payload for an ad slot bid may include attribute-value pairs conveying information regarding the particular ad slot, such as, {"tagid"; "55", "referrer": "mysite.com", "dimensions": {"width": "300", "height": "250"}}. In various examples, different publishers and advertisers may implement different preferred formats of advertisement requests.

In an example, to maintain a positive user experience for the content, a publisher may require response from potential advertisers, ad agencies, and/or ad exchanges within a certain critical time threshold. In the example, network latency may account for a significant proportion of the time spent handling a given request. Another significant source of latency may be the time a downstream actor (e.g., an advertiser seeking to advertise through an ad exchange) takes to respond to a given request. Some sources of latency may typically be outside of the control of a given actor. In an example, a balance may be struck between how many advertisers each ad impression is shopped to by a publisher and the resulting latency from waiting for responses from each advertising partner. In a typical example, an entire ad auction may be completed in under 500 ms, with winning bidders typically responding within 100 ms. In an example, to help in selecting both advertising partners as bidders as well as advertisement types (e.g., image, animated gif, low resolution video, high resolution video), a device's type (e.g., smart phone, tablet, laptop, desktop), physical characteristics (e.g., screen resolution or orientation), as well as network connection type (e.g., WiFi, 3G cellular, 4G cellular, etc.) may be factored into an ad selection process. In many examples, generic bucketing of network accessible devices by their characteristics, especially self declared characteristics may provide an inaccurate picture of the actual user experience on the device at a given time, and opportunities to better fine tune content delivery, including the delivery of advertisements, may be lost by, for example, treating every smart phone on a 4G connection the same way.

The present disclosure aims to address lost optimization opportunities presented by broadly categorizing client devices by implementing individualized connectivity based request handling, while also increasing hardware efficiency through increasing utilization and/or avoiding unnecessary utilization. For example, a connectivity probe initiated from either the client device or a load balancer service on the content provider side may relatively accurate measurements of the current connectivity metrics of a given client device (e.g., latency and bandwidth). For example, a connectivity probe measured latency and/or bandwidth metric may be significantly more accurate than a passive measurement. Data from this probe may then be used to fine tune the content being delivered, especially in the case of advertisements where, lacking a specific request from the client device, the actual content being delivered is not tied to the request for content from the client device. For example, if a device is experiencing a slower than normal connection, the load balancer may determine that there is a longer time to seek an appropriate ad for the device. In an example, probe data may also better optimize between versions of requested content being delivered to a device (e.g., low resolution vs. high resolution video or audio). Probe data may also be cached short term and refreshed regularly as connectivity changes. In an example, by triggering a probe upon receipt of a first request, the probe data may be ready to optimize a second request immediately or shortly after the first request. In an example, a content provider that would otherwise be out of contention for content delivery on a given request may be selected based on individualized connectivity based request handling. For example, a connection measured to be high latency but high bandwidth may indicate a user expectation of prolonged buffering, but that high resolution content may be displayed. In such an example, a lower usage rate delivery server located halfway across the country may be selected since the user would expect a delay before their content starts playing anyway. Similarly, an advertiser responding relatively slowly to ad requests may be included in a bidding pool to advertise in conjunction with the content being delivered from across the country due to the expected buffering time where the advertiser would otherwise be excluded.

FIG. 1 is a block diagram of a system performing individualized connectivity based request handling according to an example of the present disclosure. In an example, illustrated system 100 depicts the various typical parties in a given content delivery system. For example, client devices 172 and 173 may be any form of network accessible device (e.g., phone, tablet, laptop, desktop, server, Internet of Things ("IOT") device, etc.). These devices may access network content over network 105 which may be any type of network, for example, a public network (e.g., the Internet), a private network (e.g., a local area network (LAN) or wide area network (WAN)), or a combination thereof. In an example, devices connected through network 105 may be interconnected using a variety of techniques, ranging from a point-to-point processor interconnect, to a system area network, such as an Ethernet-based network. In the example, load balancer service 140 may be associated with any form of content distributor, such as a publisher of content, an advertiser, or some form of intermediary such as an advertisement exchange or auction service.

In an example, load balancer service 140 executes on VM 114 which executes on node 110. The system 100 may include one or more interconnected hosts (e.g., node 110). Node 110 may in turn include one or more physical processors (e.g., CPU 120A-B) communicatively coupled to memory devices (e.g., MD 125A-B) and input/output devices (e.g., I/O 130). As used herein, physical processor or processors (Central Processing Units "CPUs") 120A-B refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-B refers to a volatile or non-volatile memory device, such as RAM, ROM, EEPROM, or any other device capable of storing data. Each node may also include input/output ("I/O") devices (e.g., I/O 130) capable of providing an interface between one or more processor pins and an external device, the operation of which is based on the processor inputting and/or outputting binary data. CPUs 120A-B may be interconnected using a variety of techniques, ranging from a point-to-point processor interconnect, to a system area network, such as an Ethernet-based network. Local connections within node 110, including the connections between a processors 120A-B and a memory device 125A-B and between a processors 120A-B and a I/O 130 may be provided by one or more local buses of suitable architecture, for example, peripheral component interconnect (PCI).

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor (e.g., hypervisor 190) or a component (e.g., a virtual machine manager) that executes tasks commonly executed by hypervisors to allocate physical resources to the virtual machine. In an example, VM 114 may be a virtual machine executing on top of physical hosts (e.g., node 110), possibly with a hypervisor 190 executing between the virtualized layer and the physical hosts. In an example, load balancer service 140 may be further virtualized (e.g., in a container).

System 100 may run one or more VMs (e.g., VM 114) by executing a software layer (e.g., hypervisor 190) above the hardware and below the VM 114, as schematically shown in FIG. 1. In an example, the hypervisor 190 may be a component of a host operating system executed by the system 100. In another example, the hypervisor 190 may be provided by an application running on the host operating system, or may run directly on the node 110 without an operating system beneath it. The hypervisor 190 may virtualize the physical layer, including processors, memory, and I/O devices, and present this virtualization to VM 114 as devices, including virtual processor ("VCPU") 184, virtual memory device 186, and virtual I/O ("VI/O") 188.

In an example, VM 114 may be a virtual machine and may execute guest operating systems which may utilize the underlying virtual central processing unit ("VCPU") 184, virtual memory device ("VIVID") 186, and virtual I/O 188. Load balancer services 140 may run as one or more applications on VM 114 or may be further virtualized and execute in containers. In an example, processor virtualization for VM 114 may be implemented by the hypervisor 190 scheduling time slots on one or more physical processors (e.g., CPU 120A-B) such that from the guest operating system's perspective those time slots are scheduled on a virtual processor 184. In an example, VCPU 184 may be bound to execute on a specific physical processor in node 110. For example, instructions for VCPU 184 may execute on CPU 120A.

VM 114 may run on any type of dependent, independent, compatible, and/or incompatible applications on the underlying hardware and host operating system. In an example, load balancer service 140 running on VM 114 may be dependent on the underlying hardware and/or host operating system. In an alternative example, load balancer service 140 running on VM 114 may be independent of the underlying hardware and/or host operating system. In an example, load balancer service 140 running on VM 114 may be compatible with the underlying hardware and/or host operating system. Additionally, load balancer service 140 may be incompatible with the underlying hardware and/or OS. In an example, load balancer service 140 may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). The hypervisor 190 may manage memory for the host operating system as well as memory allocated to the VM 114 and guest operating systems.

In illustrated example system 100 in FIG. 1, load balancer service 140 may be part of an advertisement auction service operated by an ad agency, connecting client devices 172 and 173 to advertisers 160, 162, and 164 thereby allowing advertisers 160, 162, and 164 to bid on ad impressions on client devices 172 and 173 as they materialize. In an example, web content 150 may be any form of web content (e.g., news article, video streaming, email, cloud storage, etc.) accessible to client devices 172 and 173 and web content 150 may include ad slots and ad impressions. In the example, upon loading web content 150, client devices 172 and 173 contact load balancer service 140 to obtain bids for a given ad impression, and load balancer service 140 in turn may contact advertisers 160, 162, and 164 for bids for the ad impression. In an example, load balancer service 140 may respond to client devices 172 and 173 with a winning bid of advertisers 160, 162, and 164, which may either be accepted by client device 172 and/or 173, or rejected in favor of an alternative ad agency's bid. In another example, the bid from load balancer service 140 may be directly accepted and may be delivered directly with the winning advertisement, thereby saving at least one round of communications between client device 172 and a winning advertiser (e.g., advertiser 160, 162, or 164).

In another example, load balancer service 140 may be associated with a publisher of web content 150. In the example, load balancer service 140 may be responsible for directing one of many different data stores to serve requests for web content 150 to client devices 172 and 173. For example, data stores may be located locally in many regional nodes around a country, with a selection preference based on physical proximity (e.g., based on a geolocation of client devices 172 and/or 173). In the example, a data store may be any form of suitable storage system for data entries (e.g., video content, news articles, forum posts, etc.), for example, a relational database. The data in a data source may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, data in the data store may be stored in a database organized as a formal database with a schema such as a relational schema with defined tables, indices, links, triggers, various commands etc. In some examples, a data store may not be organized as a formal database, but may instead be an alternative storage structure capable of holding information, including but not limited to a file, folder, directory, registry, array, list, etc.

FIGS. 2A and B are block diagrams of an advertisement bidding system enhanced by individualized connectivity based request handling according to an example of the present disclosure. In an example, illustrated system 200 on FIG. 2A depicts client device 172 accessing web content 150, and upon loading web content 150, client device 172 may initiate a header bidding process including requesting for an ad bid from load balancer service 140 associated with an ad agency. In the example, load balancer service 140 may send probe 250 to client device 172 to further refine connectivity based advertisement settings while requesting bids from advertisers 160 and 162 on the first ad impression from client device 172. In an example, advertiser 164 may be excluded due to, for example, missing a latency cut off for devices of client device 172's device type and/or connection type. In an example, excluding advertiser 164 from an auction avoids sending a request for a bid to advertiser 164, thereby reducing networking and processing load from advertiser 164. In an example, due to a high likelihood of advertiser 164 missing a timeout threshold cutoff for the ad auction, sending a request for a bid to advertiser 164 may have a very low chance of generating a successful bid. In an example, a cumulative load increase resulting from many low probability requests may significantly contribute to advertiser 164's degraded performance. In an example, by excluding advertiser 164 from auctions during periods of low performance, processing load may be diverted away from advertiser 164, thereby contributing to advertiser 164 recovering from low performance from being overloaded. In an example, the winning bid out of the bids from advertisers 160 and 162 fails to win the overall auction conducted by client device 172 so no ad from advertisers 160, 162, or 164 is shown.

Figure 2B:
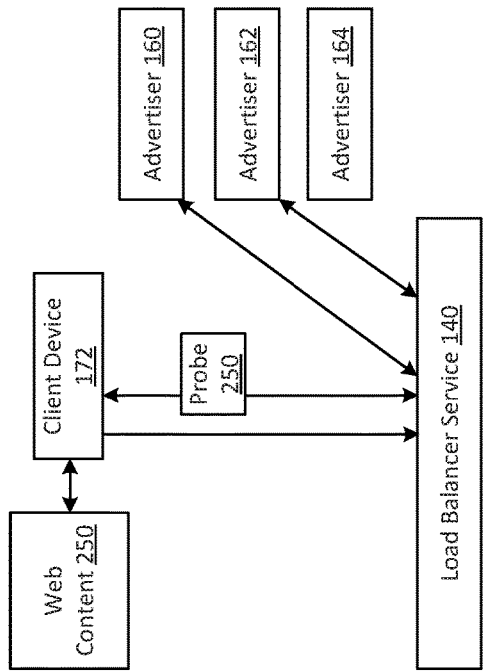

In an example, illustrated system 201 in FIG. 2B may be a future point time in system 200 from FIG. 2A. For example, system 201 may depict a second request for an ad from client device 172 after probe 250 has returned with updated connection and/or device data to load balancer service 140. In an example, client device 172 may be a laptop, and the ad agency operating load balancer service 140 may configure, as a default setting, to serve high definition ads served after a 200 ms bidding period to laptops due to laptops generally operating on relatively high bandwidth, low latency network connections (e.g., wired LAN or WiFi). In an example, advertisers 160 and 162 may be located in Chicago and may therefore have under 100 ms average response times to load balancer service 140 also in Chicago, while advertiser 164 may be located in New York City and may have over a 150 ms average response time to load balancer service 140. In the example, waiting for advertiser 164 may cause load balancer service 140 to miss the 200 ms bidding window entirely in case of a slower than average response, so advertiser 164 may be excluded by default from the auction. In the illustrated example system 201, client device 172 may be operated by a traveler from New York who has previously purchased goods through ads provided by advertiser 164. In the example, client device 172's WiFi connection may actually be a WiFi connection tethering client device 172 to a cellular phone acting as a hotspot rather than a WiFi connection connected to a wired connection. In an example, client device 172's slower than average WiFi connection may be revealed by probe 250. In the example load balancer service 140 interprets the latency lag measured by probe 250 to signify that an extra 50 ms of delay in delivering an ad would be consumed by the general latency and sluggishness of client device 172's current network connection. In the example, due to the latency measurement results provided by probe 250, load balancer service 140 increases a timeout threshold for auctions for client device 172. In the example, advertiser 164's average response time falls within the increased timeout threshold and is therefore sent a bid request and allowed to bid on a subsequent ad impression. In an example, as the highest latency advertiser in the advertiser pool (e.g., advertisers 160, 162, and 164), advertiser 164 is sent a bid request before bid requests are sent to advertisers 160 and 162. In an example, due to the previous relationship between client device 172 and advertiser 164, advertiser 164 bids significantly higher than advertisers 160 and 162 on client device 172's second ad impression from accessing a second page of web content 150 and wins the auction for the ad impression. In the example, client device 172 retrieves the winning ad from advertiser 164 and displays it. In an example, measurements by probe 250 may be accurate to a similar degree as the accuracy of a system clock of load balancer service 140.

In an alternative example, web content 150 may be located overseas from client device 172. In the example, probe 250 may determine that a response from many different domestic advertisers (e.g., New York, Chicago, and Los Angeles) will arrive before web content 150 arrives from Tokyo. In the example, rather than limiting an auction to local advertisers 160 and 162 (e.g., in Chicago), high performing advertisers from both coasts (e.g., advertiser 164 in New York City and an advertiser in Los Angeles) may be included in an ad auction for client device 172.

FIGS. 3A-D are block diagrams of a individualized connectivity based request handling system changing content delivery based on current connectivity data according to an example of the present disclosure. In an example, device settings for a client device 172 may initially be set based on passively acquired information from a session initialization handshaking process between client device 172 and load balancer service 140. In illustrated example system 300 on FIG. 3A, client device 372 may be a smartphone with a WiFi connection 320 and a cellular connection 330. In an example, WiFi connection 320 may be both higher bandwidth and lower latency than cellular connection 330. Therefore, load balancer service 140 may be configured to set a shorter timeout (e.g., 200 ms) and therefore a shorter auction window for client device 372 when a request comes through the WiFi connection vs. the cellular connection in order to synchronize ad delivery with expected content delivery timelines. In the example, when a request for an ad bid comes from WiFi connection 320, load balancer service 140 may request bids only from advertisers 160 and 162 with average response times well under the 200 ms limit.

Figures 3A, 3B:
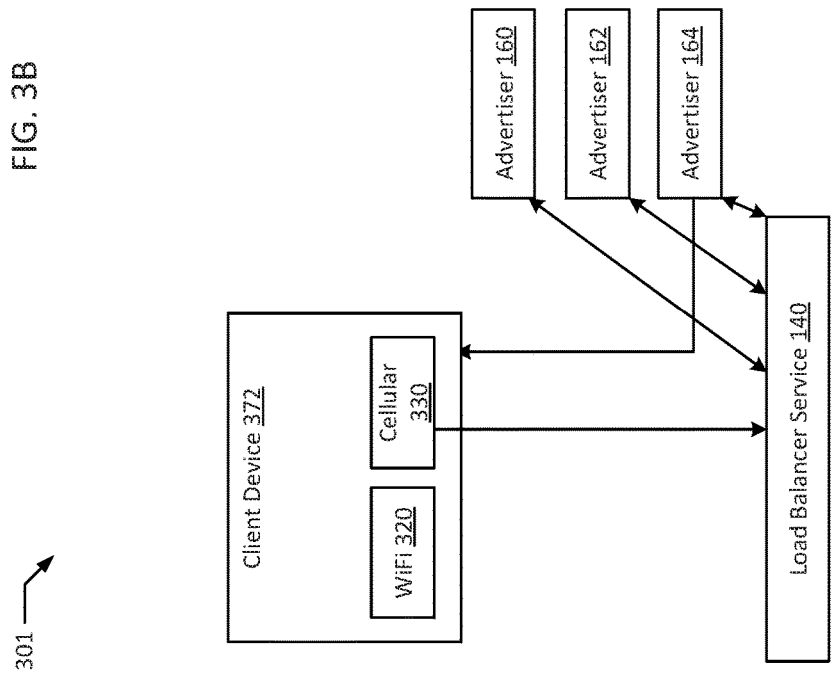
FIGS. 3A-D are block diagrams of a individualized connectivity based request handling system changing content delivery based on current connectivity data according to an example of the present disclosure.

In an example, illustrated system 301 in FIG. 3B depicts a separate connection session for client device 372, where cellular connection 330 is used. In the example, due to cellular connection 330 typically being a lower bandwidth, higher latency connection than WiFi connection 320, load balancer service 140 requests bids from all of advertisers 160, 162, and 164. For example, load balancer service 140 may configure cellular connection 330 requests to have a default timeout value of 500 ms. In the example, advertiser 164, which may be taking on average 200 ms to respond with bids to bid requests, for example, due to being overloaded, may put in a high bid on the ad impression through the cellular connection 330. In an example, advertiser 164's bid wins the auction for the ad impression and displays an ad on client device 372.

Figure 3D:
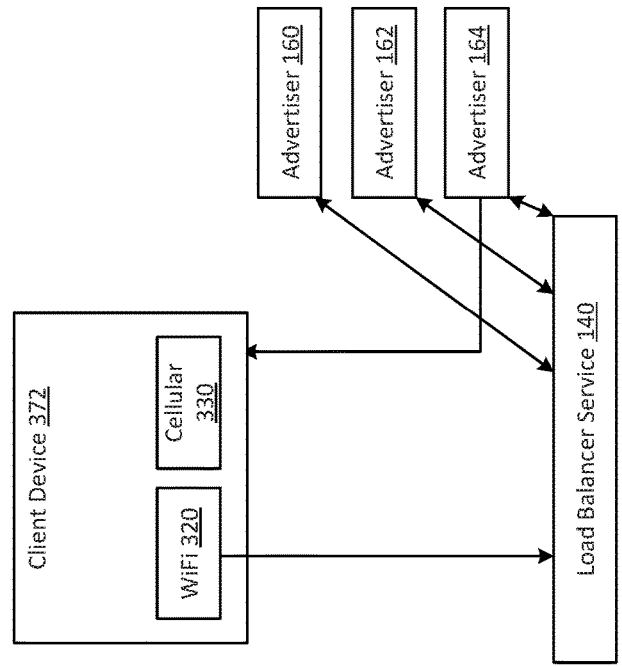
Figure 3C:
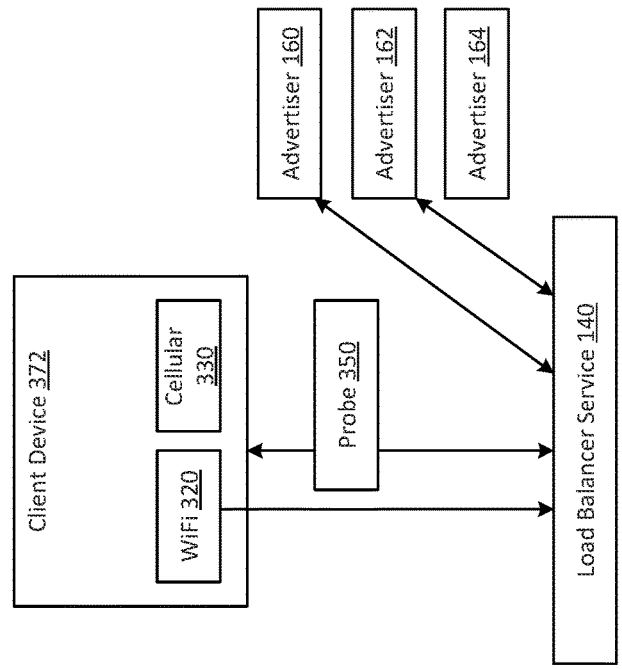

In an example, illustrated system 302 in FIG. 3C depicts yet another connection session for client device 372. In the example, multiple sequential ad impressions are requested by client device 372. In an example, illustrated system 302 may depict a first request for an ad impression of the third session by client device 372. In an example, client device 372 in system 302 is connected via WiFi connection 320, and therefore load balancer service 140 defaults to a low (e.g., 200 ms) timeout threshold for bidding on a first ad impression of the third session. In the example, load balancer service 140 sends probe 350 to client device 372 in response to receiving the first request related to the first ad impression. In an alternative example, client device 372 may be configured to send a probe (e.g., probe 350) to load balancer service 140, for example, in conjunction with a first ad request of a new session. In the example, due to being a new connection in a new session, load balancer 140 may revert to default settings for client device 372 (e.g., 200 ms timeout with advertiser 164 excluded in case of missing the timeout). In an example, advertisers 160 and 162 respond with bids but the bids do not win the first ad impression.

In an example, illustrated system 303 in FIG. 3D depicts a second ad impression request for client device 372 of the third session from system 302. In the example, probe 350 has returned results which may include connection and/or device data for client device 372. In an example, probe 350 may indicate that WiFi connection 320 has unusually high latency for a WiFi connection. For example, rather than a WiFi connection connected to a local area network, WiFi connection 320 may be a connection to a WiFi hotspot and may actually be routing through a cellular connection. In another example, WiFi connection 320 may have a weak signal. In either example, load balancer service 140 may determine that a significant timeout increase for ad bidding would be imperceptible to client device 372, for example, in conjunction with a related latency increase in loading web content 150 predicted to be experienced by client device 372. In the examples, advertiser 164's average response latency meets a threshold for inclusion under the increased ad bidding timeout threshold. For example, load balancer service 140 may be configured such that only advertisers (e.g., advertisers 160, 162, and 164) whose average response times are at least 20% lower than the ad bidding timeout threshold for a given client device (e.g., client device 372) are sent bid requests in any given auction. In another example, only advertisers (e.g., advertisers 160, 162, and 164) whose average response times beat a timeout threshold by a given amount of time are sent bid requests (e.g., by a 50 ms margin). In an example, advertiser average response times are tracked by load balancer service 140. In the example, load balancer service 140 may be configured to ignore outliers in response time for computation of average response times. In an example, advertiser 164 is given a chance to bid on a new ad impression, for example, due to client device 372 accessing a new page of web content 150. In the example, advertiser 164 puts in a winning bid and serves an ad to client device 372.

In an example, the inverse scenario is also possible, where client device 372's cellular connection 330 is performing unusually well as revealed by probe 350. In such a situation, slow responding advertiser 164 may be removed from the advertiser pool (e.g., advertisers 160 and 162) due to, for example, a lowering of an auction timeout value on load balancer service 140 to preserve the user experience on client device 372. In an example, a publisher of web content 150 may enforce that ads do not delay the loading of the publisher's content (e.g., web content 150).

Figure 4:
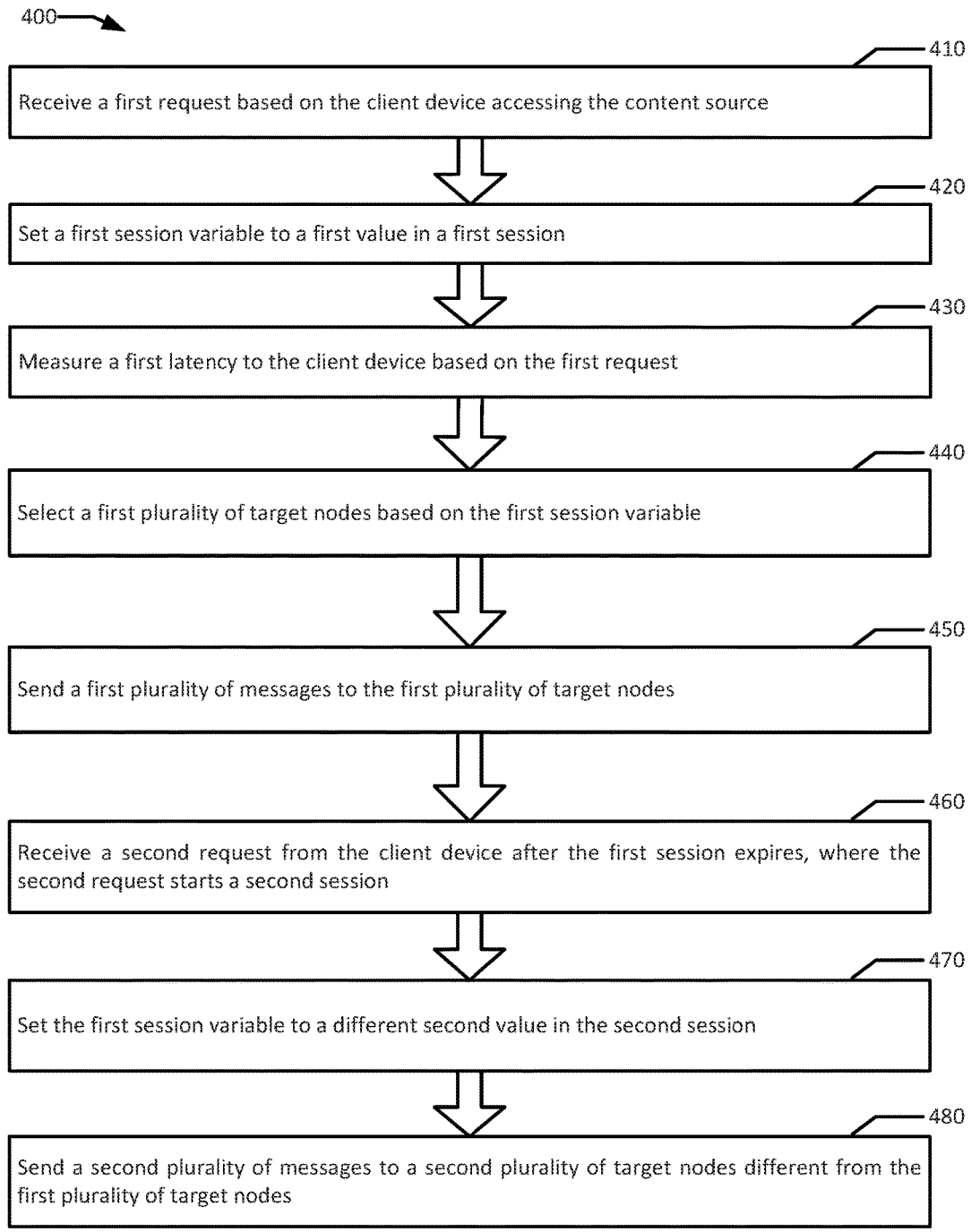
FIG. 4 is a flowchart illustrating individualized connectivity based request handling according to an example of the present disclosure.

FIG. 4 is a flowchart illustrating individualized connectivity based request handling according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by load balancer service 140.

A first request is received based on a client device accessing a content source (block 410). In an example, load balancer service 140 receives a request from client device 172 based on client device 172 accessing web content 150. In an example, load balancer service 140 is part of a service delivering web content 150. In another example, load balancer service 140 is part of a system delivering a secondary component of content related to web content 150 (e.g., an advertisement). In an example, load balancer service 140 derives information regarding client device 172 from receiving the first request. In an example, client device 172's request includes information (e.g., stored in metadata, a cookie, etc.) with technical data for client device 172. For example, client device 172 may declare a device type, make, and/or model to load balancer service 140. In an example, load balancer service 142 may also receive information regarding a network connection type for client device 172 (e.g., wired, wireless) and the information may further include details of higher granularity (e.g., wired—fiber optic vs. wired coaxial, or wireless—WiFi vs. wireless—4G vs. wireless—3G, etc.). In an example, load balancer service 140 may further receive information such as an orientation of client device 172, a user identifier of client device 172, and/or a physical motion state of client device 172. In an example, client device 172 first connects via a WiFi connection to load balancer 140.

A first session variable is set to a first value in a first session (block 420). In an example, after a request is made to load balancer service 140 by client device 172, a first client session is established, and at least one session variable is set to determine certain content serving configurations for load balancer service 140 in relation specifically to client device 172. In an example, at the initiation of a first session or a new session after a prolonged (e.g., 30 minute) delay, load balancer service 140 may revert to default settings for client device 172 based on, for example, physical characteristics of client device 172 (e.g., device type, connection type, etc.). In an example, the first session variable is one of a timeout value, a request class, a client device type, and a network connection type. In an example, a timeout value may be a time limit for serving a request or for awaiting a response. For example, a video streaming service may wait for a timeout value before terminating a stream due to lack of response, while an ad agency may cut off additional bidders for a given ad impression after hitting a timeout value. In an example, a request class may include a type of request. For example, a request for a video advertisement would not be sent to an image or audio advertiser for bids. A client device type may include physical characteristics of client device 172 (e.g., make, model, screen size, headphone vs. speaker, etc.). In an example, a network connection type may include a currently active connection (e.g., the interface used to send the request) and/or other connection interfaces on client device 172 that currently have signal. In an example, one or more additional session variables may be implemented to store the various data points listed above. In an example, additional session variables may also include a motion setting, an orientation setting, and/or a network bandwidth setting. In the example, a motion setting may be indicative of client device 172's likelihood to loose signal (e.g., moving along a highway or train track), or a likelihood that client device 172's user is not looking at the screen (e.g., jerky motion indicative of running). In an example, an orientation setting (e.g., portrait vs. landscape) may indicate a preferred orientation of content served to client device 172. In an example, a network bandwidth setting may be received by load balancer 140 from client device 172, or may be a product of testing via sending data to client device 172.

A first latency to the client device is measured based on the first request (block 430). In an example, load balancer service 140 may first passively compute a latency to client device 172 based on the first request, prior to any proactive measurement via probe (e.g., probe 250). In an example, load balancer service 140 computes the first latency from an elapsed time between (i) the client device 172 accessing web content 150 and load balancer service 140 receiving the first request, (ii) the content source of web content 150 responding to the client device 172 and the load balancer service 140 receiving the first request, and (iii) the client device 172 sending the first request and the load balancer service 140 receiving the first request. In an example, passive computation is limited in accuracy by how closely in sync each of the various parties' (e.g., load balancer service 140, client device 172, and web content 150's provider) clocks are with each other. For example, computations based on timestamp for timings on a millisecond scale may easily be thrown off by enough to be useless due to a drift between the clocks of half a second, a time difference which a human operator may fail to notice at all.

In an example, load balancer service 140 proactively seeks identifying information about client device 172. For example, a probe 250 may be triggered to measure a client device variable of client device 172. In an example, probe 250 may be sent by load balancer service 140 as a query to client device 172. In another example, probe 250 may be sent from the publisher of web content 150. In yet another example, probe 250 may be initiated by client device 172, for example, in conjunction with requesting an ad, and the results of probe 250 may later be forwarded to load balancer service 140. In an example, the client device variable is a second latency measured between the load balancer service 140 and the client device 172 and/or a network bandwidth measurement of the client device 172. In an example, the client device variable is stored in a cookie on the client device 172. In the example, the client device 172 may send the client device variable to load balancer service 140, until the cookie expires. For example, a later second connection session to load balancer service 140 may default to different connectivity and content serving settings based on the cookie.

A first plurality of target nodes is selected based on the first session variable (block 440). In an example, load balancer service 140 selects one or more potential targets to serve client device 172's request. In an example, the plurality of target nodes (e.g., advertisers 160, 162, and/or 164) is selected based on a respective average response time from each of the plurality of target nodes (e.g., advertisers 160, 162, and 164). For example, for a video streaming service implementing load balancer service 140, the load balancer 140 may select the nearest streaming server to client device 172 geographically, with a secondary server being the next nearest geographically. In an example, a weather reporting service implementing load balancer 140 may default to image or video weather reports, and may default to target nodes (e.g., weather service servers) in a GPS location of client device 172. In an example, the first plurality of target nodes is a plurality of advertisers (e.g., advertisers 160, 162, and/or 164), the load balancer service 140 conducts a first auction with the first plurality of target nodes (e.g., advertisers 160, 162, and/or 164) for a first advertisement impression associated with a first view of web content 150 from the content source accessed by the client device 172. In the example where load balancer service 140 is implemented by an advertising agency conducting real-time bidding for an ad impression on client device 172, advertisers joining a round of bidding (e.g., advertisers 160, 162, and/or 164) may be selected based on an average response time for bids by the advertisers 160, 162, and/or 164. In the example, the first session variable may be a timeout value, which may in turn dictate which advertisers (e.g., advertisers 160, 162, and/or 164) may participate in the auction without a high likelihood of risking a delay resulting in a failure to bid on the ad impression at all.

In an example, a client device variable may be measured by load balancer service 140 (e.g., via probe 250) or may be self-reported by client device 172. In the example, an advertisement type (e.g., text, audio, image, animated gif, low resolution video, high resolution video) is selected based on the client device variable. In an example, a client device variable of client device 172 may be stored during an active session with load balancer service 140 as a session variable. In an example, a client device variable may include connection latency and/or bandwidth information between client device 172 and load balancer service 140. In an example, load balancer service 140 adjusts an advertisement auction setting based on a client device variable. In an example, the advertisement auction setting includes an auction timeout setting and/or an auction target setting. In an example, the auction target setting is based on the auction timeout setting. For example, upon measuring via probe 250 that client device 172 has higher than expected latency, load balancer service 140 may increase the auction timeout setting for ad bidding for client device 172, thereby allowing slower advertisers (e.g., advertiser 164) to participate. In an example, upon querying and discovering that client device 172 is moving erratically, video-only advertisers (e.g., advertiser 162) are skipped in an auction in favor of advertisers also serving audio ads (e.g., advertiser 160). In an example, passive latency calculations may be achieved by using a timestamp attached to a request from client device 172, for example in a JavaScript® request. In the event where the calculated elapsed time based on timestamp is outside of minimum or maximum thresholds, a probe 250 may be triggered to account for potential clock discrepancies between client device 172 and load balancer service 140.

A first plurality of messages is sent to the first plurality of target nodes (block 450). In an example, load balancer service 140 sends a plurality of translated requests (e.g., requests for bids) to each selected target node in the first plurality of target nodes (e.g., advertisers 160 and 162). In an example, target nodes may be selected based on a combination of factors including content availability factors and delivery performance factors. For example, a video hosting service may check for the availability of a given video, or if placed on a shuffle or random mode, check that a target node has content (e.g., web content 150) in the right category or genre. Similarly, serving video typically requires high bandwidth, but users may typically expect a slight delay or buffering period, especially when accessing distant content (e.g., from overseas). In an example, a weather report from a weather service may be expected to be delivered with low latency regardless of format, so downgrading quality (e.g., high resolution video to low resolution video to image to text) may be preferable to a perceptible delay in delivering a weather report. In an advertisement serving system, it would be a waste of time and resources to request for a video advertiser to bid on a still banner ad, so content type becomes very important for efficiency, for example, by reducing unnecessary network traffic and processing tasks. In addition, requesting and receiving bids with low latency becomes extremely important because of stringent time limits imposed on auctions to preserve the user experience for web content 150. In such systems, cutting off slow responding target nodes (e.g., advertiser 164) may mean the difference between successfully placing a bid in time for an ad impression and being rejected for being too slow.

In a typical browsing session, client device 172 may access numerous pages from numerous content providers (e.g., web content 150). To the extent that a plurality of these content providers are affiliated with a given ad agency, this ad agency may expect to receive multiple subsequent requests for ads after receiving an initial request for ads. Therefore, for the ad agency, being able to enhance the likelihood of successfully placing a subsequent series of ads may equate to a large computing efficiency increase. In these cases, a probe (e.g., probe 250) may be implemented to better tailor subsequent ad placements. In an example, the probe is sent by the load balancer service 140 and/or the client device 172 and results from the probe are stored as a second session variable. In an example, probe 250 measures a round trip latency between the load balancer service 140 and the client device 172. Probe 250 may also measure a latency between the load balancer service 140 or the client device 172, and a host of web content 150. In an example, latency may be measured via a ping from either client device 172 or load balancer service 140. In the example, factors such as DNS lookup time, wait time, TCP/IP lag, and connection bandwidth may factor into total latency between client device 172 and load balancer service 140. In an example, latency from client device 172 to load balancer service 140 may not equal the reverse latency from load balancer service 140 to client device 172, and both latencies may be factored into any session variable or settings adjustments made by load balancer service 140. For example, load balancer service 140 may be collocated with DNS and therefore have a much lower DNS response time than a mobile device (e.g., client device 172) out in the countryside.

In an example, probe 250 measures a network bandwidth of the client device 172. In the example, bandwidth may be measured in addition to or instead of latency. In an example bandwidth and latency may be measured by separate probes. In an example, latency may be associated with a response timeout setting, while bandwidth may be associated with a content type setting. For example, on a client device 172 with a high latency may be insensitive to delayed content buffering times, for example, having a video delivered from a low use data center in Kansas City to a device in a Washington D.C. suburb, thereby increasing the utilization of the underutilized data center. Consequently, the same client device 172 may provide a longer period for acquiring bids on an ad associated with the video, so more distantly located advertisers may have time to respond with a bid on an ad. In an example, client device 172 located in Washington D.C. actually belongs to a Chicago traveler, and a Chicago advertiser who would be willing to place a high bid for the Chicago traveler's business may not get a chance to bid under a default timeout setting on load balancer service 140. In the example, because of the high latency experienced by client device 172, the Chicago advertiser is given a chance to bid and places an ad that would not have been given a chance otherwise. In another example, a measurement from probe 250 may indicate, for example, low latency and low bandwidth (e.g., when client device 172 is moving at high speed in a metropolitan area). In the example, video content and ads may be disabled in favor of image ads to avoid packet loss as client device 172 move between cell phone towers interrupting a video.

In an example, probe 250 may be triggered by client device 172 accessing the content source (e.g., web content 150). In an example, probe 250 is triggered based on a timing discrepancy between any two of the load balancer service 140, the client device 172, and a publisher of web content 150. In an example, the load balancer service 140 receives another request in a first session from the client device 172 and sends another plurality of messages to an updated plurality of target nodes (e.g., advertisers 160, 162, and 164) different from the first plurality of target nodes (e.g., advertisers 160 and 162) based on the second session variable (e.g., a latency and/or bandwidth measurement by probe 250). In an example, a client device variable (e.g., latency measurement, bandwidth measurement, orientation, movement, resolution, etc.) is stored in a cookie on client device 172. In an example, the client device variable is transmitted to load balancer service 140 where the client device variable is stored as a session variable.

A second request is received from the client device after the first session expires, wherein the second request starts a second session (block 460). In an example, connection sessions with load balancer service 140 expire after a given amount of time. In another example, a connection session between load balancer service 140 and client device 172 may expire based on client device 172 changing a connection interface (e.g., WiFi vs. 4G). In an example, a session duration between load balancer service 140 and client device 172 may be based on an associated Secure Socket Layer ("SSL") or other encryption session. The first session variable is set to a different second value in the second session (block 470). In an example, load balancer service 140 sets a timeout value for client device 172's new requests under the second session to a different value. For example, load balancer service 140 may change a timeout value from a shorter value for a previous WiFi connection to a longer timeout value for a new 4G session. In another example, client device 172 sends a cookie storing a previous latency value for a previous 4G session that is significantly lower than the average 4G connection, and load balancer service 140 responds by setting a short timeout value for the new 4G connection based on the previous value in the cookie. A second plurality of messages is sent to a second plurality of target nodes different from the first plurality of target nodes (block 480). In an example, where the first message of first session (e.g., WiFi) was sent to a first plurality of target nodes (e.g., advertisers 160 and 162), the first message of the second session (e.g., wireless 4G) is sent to a different plurality of target nodes (e.g., advertisers 160, 162, and 164).

Figure 5:
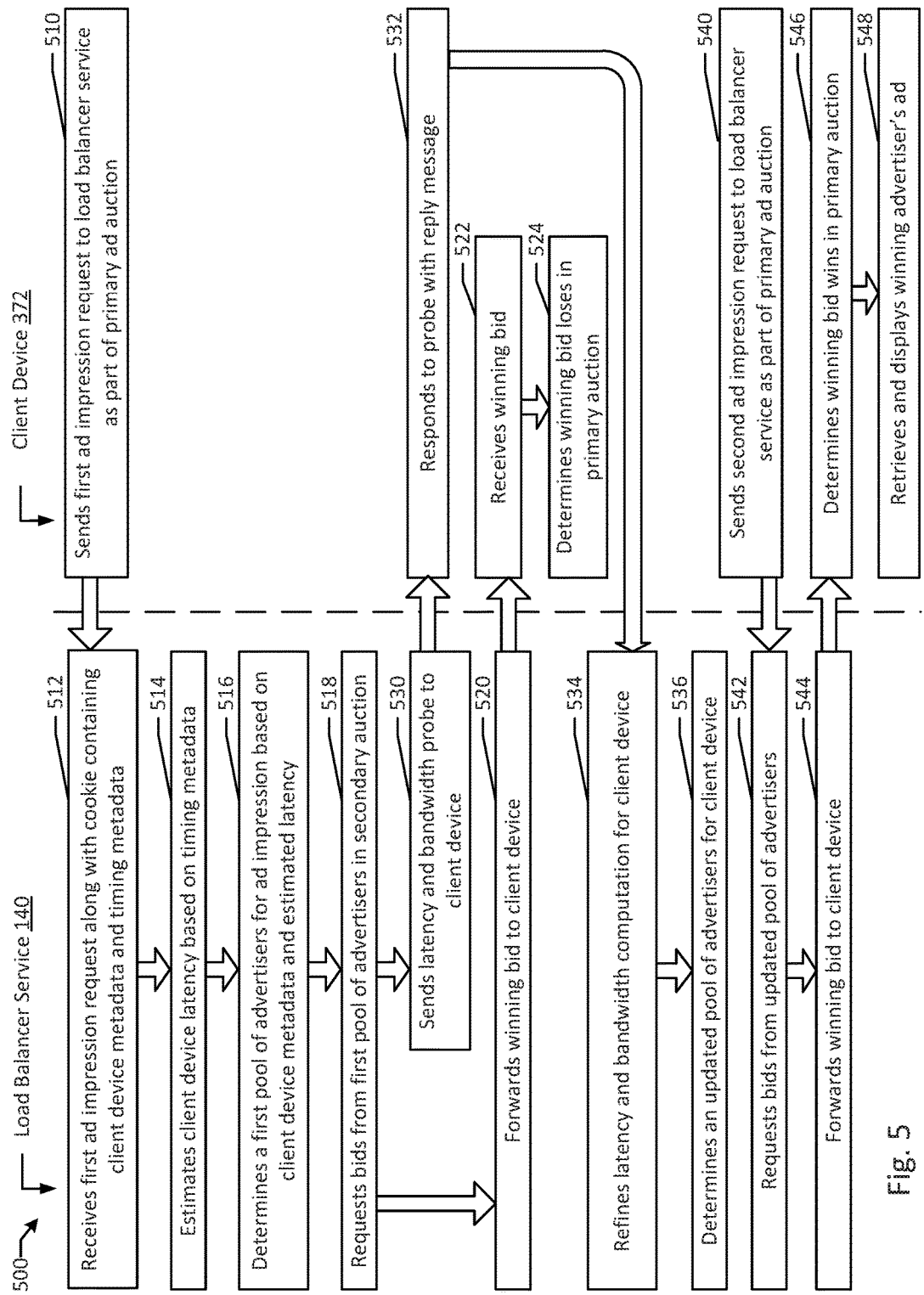
FIG. 5 is a flow diagram illustrating individualized connectivity based request handling in an advertisement bidding system according to an example of the present disclosure.

FIG. 5 is a flow diagram illustrating individualized connectivity based request handling in an advertisement bidding system according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, load balancer service 140 and a client device 172 combine improve advertisement delivery with individualized connectivity based request handling.

In system 500 as illustrated in FIG. 5, client device 372 first connects to load balancer service 140 over a WiFi connection 320 to send a first ad impression request (e.g., based on accessing web content 150) to load balancer service 140 as part of a primary header bidding ad auction executed on client device 372 (block 510). In the example, load balancer service 140 receives the first ad impression request along with a cookie containing metadata related to physical characteristics of client device 372 (e.g., device type, orientation, resolution, etc.) and also timing metadata in the form of a UTC timestamp when client device 372 sent the request (block 512). In an example, client device 372 may be a smartphone and the user of client device 372 may manually have their time zone set to a home time zone while traveling, disabling time synchronization with the device's cellular network. In an example, load balancer service 140 estimates client device 372's network latency based on the UTC timestamp in the request (block 514). In the example, the estimated network latency may actually be depressed by 200 ms due to drift in client device 372's clock (e.g., client device 372's clock is running 200 ms fast), but the estimated latency may not immediately trigger a red flag because the estimated latency may still be within acceptable limits. For example, an actual latency of 280 ms is calculated to be 80 ms due to clock drift. In the example, both 280 ms and 80 ms are commonly observed client device latencies, but the difference in latency between 80 ms and 280 ms is enough to alter user expectations for responsiveness. In an example, a calculated latency outside of acceptable thresholds may trigger an immediate latency probe from load balancer service 140. In an example a first pool of advertisers (e.g., advertisers 160 and 162) is selected based on the client device metadata and estimated latency (block 516). In the example, because of the very low calculated latency of 80 ms, only the fastest responders among advertisers (e.g., advertisers 160 and 162) are given a chance to bid on the ad impression.

In an example, load balancer service 140 requests bids from advertisers 160 and 162 in a secondary auction under the primary auction hosted on client device 372 (block 518). In an example, load balancer service 140 may pass a winning bid from its secondary auction on to client device 372 as an entry in client device 372's primary auction. In an example, load balancer service 140 sends the winning bid between advertisers 160 and 162 to client device 372 (block 520). In an example, simultaneously with sending the requests for bids to advertisers 160 and 162, load balancer service 140 may send a latency and bandwidth probe 350 to client device 372 (block 530). In an example, probe 350 may be sent before the bid requests. In another example, probe 350 may be sent after the bid requests. In some examples, probe 350 may be sent in parallel with the bid requests (e.g., through a separate network interface). In an example client device 372 first receives probe 350 and responds with a reply message (block 532). For example, client device 372 may respond with an acknowledgement of the latency probe (e.g., a ping), allowing load balancer service 140 to measure a current latency with client device 372. In an example, load balancer service's bandwidth probe may be a transmission of a file similar in size with an ad, to gauge how long it would take for client device 372 to load the ad. In an example, after responding to the probe 350, client device 372 receives the winning bid of the first secondary auction from load balancer service 140 (block 522). In an example, client device 372 determines that the winning bid of the first secondary auction loses in the first primary auction, and sources an ad from a competing service to load balancer service 140 (block 524).

In an example, load balancer service 140 refines latency and bandwidth computation settings for client device 372 based on client device 372's responses to probe 350 (block 534). In an example, the refinement of client specific latency and bandwidth settings for client device 372 is completed before a second ad impression request from client device 372. In an example, load balancer service 140's ping took 295 ms to return from client device 372, indicating that the previous calculation of 80 ms was erroneous. In some examples, discrepancies in calculated latency greater than a set threshold (e.g., 50%) may be retested by reprobing. In an example, based on the updated 295 ms latency, advertiser 164 is added to an updated pool of advertisers (e.g., advertisers 160, 162, and 164) for client device 372 (block 536).

In an example, client device 372 sends a second ad impression request to load balancer service 140 as part of a second header bidding ad auction (block 540). In the example, load balancer service 140 requests bids from the updated pool of advertisers (e.g., advertisers 160, 162, and 164) (block 542). In an example, load balancer service 140 forwards a winning bid from advertiser 164 to client device 372 (block 544). In an example, client device 372 determines that the winning secondary auction bid from advertiser 164 also wins the primary header bidding auction (block 546). In the example, client device 372 retrieves and displays an ad from advertiser 164 (block 548).

Individualized connectivity based request handling delivers improved data center utilization and efficiency by tailoring content delivery of both published web content and associated ancillary content (e.g., advertisements) to the actual current capacity (e.g., latency and bandwidth) of the client device in question. For example, a client device 372 on a high latency high bandwidth connection (e.g., loading overseas content or due to damage at a switch), may be served from a data center selected for low utilization. The same client device 372 may also allow for a more comprehensive auction with more respondents for ad impressions associated with the content served. Similarly, compute resources may be saved where client device 372 is experiencing low latency and low bandwidth by avoiding the delivery of contents that may not properly load (e.g., high resolution video). In an example, by instrumenting and tracking connectivity on an individualized basis, a load balancer 140 implementing individualized connectivity based request handling may increase data center utilization thereby reducing computing resource overhead. In addition, by predictively excluding target nodes that are likely to fail to respond in a sufficiently timely manner, load balancer 140 reduces overall processing and network load, thereby increasing effective computing capacity.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a content source accessed by a client device over a network; and
a load balancer service across the network from the client device executing on one or more processors to:
receive a first request based on the client device accessing the content source;
establish a first session between the client device and the load balancer service;
set a first session variable to a first value in the first session;
send a first plurality of messages to a first plurality of target nodes selected based on the first value of the first session variable;
update the first value to a second value responsive to receiving a result of a probe sent by one of the load balancer service and the client device, wherein the result of the probe is stored by at least one of the load balancer service and the client device as a client device variable;
receive a second request in the first session from the client device;
send a second plurality of messages to a second plurality of target nodes different from the first plurality of target nodes based on the second value of the first session variable;
establish a second session between the load balancer service and the client device after the first session is terminated; and
in the second session, setting a first session variable of the second session to a third value based on the client device variable stored from the first session.

2. The system of claim 1, wherein the first session variable is one of a timeout value, a request class, a client device type, and a network connection type.

3. The system of claim 1, wherein a first latency between the load balancer service and the client device is computed from an elapsed time between at least one of (i) the client device accessing the content source and the load balancer service receiving the first request, (ii) the content source responding to the client device and the load balancer service receiving the first request, and (iii) the client device sending the first request and the load balancer service receiving the first request.

4. The system of claim 1, wherein the first plurality of target nodes is selected based on a respective average response time from each of the first plurality of target nodes.

5. The system of claim 1, wherein the probe measures at least one of a round trip latency between the load balancer service and the client device and a network bandwidth of the client device.

6. The system of claim 1, wherein the probe is triggered based on one of (i) the client device accessing one of the content source and the load balancer service and (ii) a timing discrepancy between the load balancer service and the client device.

7. The system of claim 1, wherein the client device variable is one of a measured latency between the load balancer service and the client device, a network bandwidth of the client device, a screen resolution of the client device, a user account logged into the client device, and a measurable physical attribute of the client device.

8. The system of claim 1, wherein the first plurality of target nodes is a plurality of advertisers, the load balancer service conducts a first auction with the first plurality of target nodes for a first advertisement impression associated with a first view of the content source accessed by the client device.

9. The system of claim 8, wherein an advertisement type is selected based on a client device variable, an advertisement auction setting is adjusted based on a client device variable, and the advertisement auction setting includes at least one of an auction timeout setting and an auction target setting.

10. A method comprising:
receiving a first request based on a client device accessing a content source over a network;
establishing a first session between the client device and a load balancer service over the network;
setting a first session variable to a first value in the first session;
sending a first plurality of messages to a first plurality of target nodes selected based on the first value of the first session variable;
updating the first value to a second value responsive to receiving a result of a probe sent by one of the load balancer service and the client device, wherein the result of the probe is stored by at least one of the load balancer service and the client device as a client device variable;
receiving a second request in the first session from the client device; and
sending a second plurality of messages to a second plurality of target nodes different from the first plurality of target nodes based on the second value of the first session variable;
establishing a second session between the load balancer service and the client device after the first session is terminated; and in the second session, setting a first session variable of the second session to a third value based on the client device variable stored from the first session.

11. The method of claim 10, wherein the first session variable is one of a timeout value, a request class, a client device type, and a network connection type.

12. The method of claim 10, further comprising:
computing a first latency between the load balancer service and the client device from an elapsed time between at least one of (i) the client device accessing the content source and the load balancer service receiving the first request, (ii) the content source responding to the client device and the load balancer service receiving the first request, and (iii) the client device sending the first request and the load balancer service receiving the first request.

13. The method of claim 10, further comprising:
selecting the first plurality of target nodes based on a respective average response time from each of the first plurality of target nodes.

14. The method of claim 10, wherein a second session variable includes at least one of a motion setting, an orientation setting, and a network bandwidth setting.

15. The method of claim 10, further comprising:
measuring, by the probe, a round trip latency between the load balancer service and the client device.

16. The method of claim 10, further comprising:
measuring, by the probe, a network bandwidth of the client device.

17. The method of claim 10, further comprising:
triggering the probe based on the client device accessing one of the content source and the load balancer service.

18. The method of claim 10, further comprising:
triggering the probe based on a timing discrepancy between the load balancer service and the client device.

19. The method of claim 10, wherein the client device variable is one of a measured latency between the load balancer service and the client device, a network bandwidth of the client device, a screen resolution of the client device, a user account logged into the client device, and a measurable physical attribute of the client device.

20. The method of claim 10, further comprising:
storing the client device variable in a cookie.

21. The method of claim 10, wherein the first plurality of target nodes is a plurality of advertisers, the load balancer service conducts a first auction with the first plurality of target nodes for a first advertisement impression associated with a first view of the content source accessed by the client device.

22. The method of claim 21, further comprising:
selecting an advertisement type based on a client device variable.

23. The method of claim 22, further comprising:
adjusting an advertisement auction setting based on a client device variable.

24. The method of claim 23, wherein the advertisement auction setting includes at least one of an auction timeout setting and an auction target setting.

25. The method of claim 24, wherein the auction target setting is based on the auction timeout setting.

26. A computer-readable non-transitory storage medium storing executable instructions, which when executed by a computer system, cause the computer system to:
receive a first request based on a client device accessing a content source over a network;
establish a first session between the client device and a load balancer service over the network;
set a first session variable to a first value in the first session;
send a first plurality of messages to a first plurality of target nodes selected based on the first value of the first session variable;
update the first value to a second value responsive to receiving a result of a probe sent by one of the load balancer service and the client device, wherein the result of the probe is stored by at least one of the load balancer service and the client device as a client device variable;
receive a second request in the first session from the client device; and
send a second plurality of messages to a second plurality of target nodes different from the first plurality of target nodes based on the second value of the first session variable;
establish a second session between the load balancer service and the client device after the first session is terminated; and
in the second session, setting a first session variable of the second session to a third value based on the client device variable stored from the first session.

* * * * *